United States Patent Office 3,798,293
Patented Mar. 19, 1974

3,798,293
O-ALKYL-S-SUBSTITUTED-O-NAPHTHYL-PHOSPHOROTHIOLATES
Shigeo Kishino and Yasuo Yamada, Tokyo, Akio Kudamatsu, Kanagawa-ken, Yoshio Kurahashi, Shoozo Sumi, and Morisuke Seki, Tokyo, and Koozo Shiokawa, Kanagawa-ken, Japan, assignors to Bayer Aktiengesellschaft, Leverkusen, Germany
No Drawing. Filed Oct. 14, 1970, Ser. No. 80,762
Claims priority, application Japan, Oct. 21, 1969, 44/83,602
Int. Cl. A01n 9/36; C07f 9/16
U.S. Cl. 260—964                    8 Claims

ABSTRACT OF THE DISCLOSURE

O - alkyl - S - substituted-O-naphthylphosphorothiolates, i.e. O-lower alkyl-S-lower alkyl, lower alkenyl or lower alkoxyethyl-O-naphthylphosphorothiolates which may contain up to three halogen atoms on the naphthyl ring, which possess insecticidal and fungicidal properties, as well as compositions containing such phosphorothiolates and methods of combating insects and fungi using such phosphorothiolates.

---

The present invention relates to and has for its objects the provision of particular new phosphorothiolates, i.e. O-lower alkyl-S-lower alkyl, lower alkenyl or lower alkoxyethyl - O - naphthylphosphorothiolates which may contain up to three halogen atoms on the naphthyl ring, which possess insecticidal and fungicidal properties, active compositions in the form of mixtures of such compounds with solid and liquid dispersible carrier vehicles, and methods for producing such compounds and for using such compounds in a new way especially for combating insects and fungi, with other and further objects becoming apparent from a study of the within specification and accompanying examples.

Japanese patent publication No. 16,875/63 indicates that the compound of the following formula has some insecticidal activity:

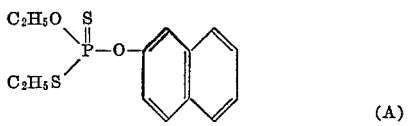

It has now been found, in accordance with the present invention, that the particular new O-lower alkyl-S-lower alkyl, lower alkenyl or lower alkoxyethyl-O-naphthylphosphorothiolates of the formula

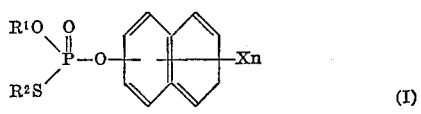

wherein
$R^1$ is a lower alkyl radical,
$R^2$ is a lower alkyl, lower alkenyl or lower alkoxyethyl radical,
X is a halogen atom, and
$n$ is 0 to 3,
exhibit strong insecticidal and fungicidal properties.

It has furthermore been found, in accordance with the present invention, that the particular new compounds of Formula I above may be produced by the following two processes. In process variant (a) a compound of the formula:

is reacted with a compound of the formula:

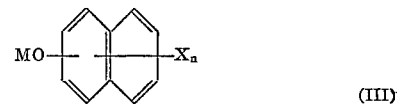

or in process variant (b) a compound of the formula:

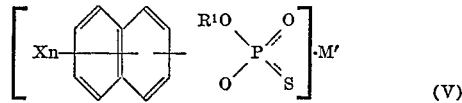

is reacted with a compound of the formula:

$$\text{Hal—R}^2 \qquad (V)$$

in which $R^1$, $R^2$, X and $n$ have the same meanings as above, M is hydrogen, a metal equivalent, or ammonium and Hal is halogen.

Advantageously, in accordance with the present invention, in the various formulae set forth herein:

$R^1$ is preferably an alkyl group with 1 to 4 carbon atoms, such as methyl, ethyl, n- or iso-propyl, and n-, iso-, sec.- or tert.-butyl, and especially methyl, ethyl or n-butyl, more especially ethyl;

$R^2$ is preferably an alkyl group stated above, and especially n-propyl or alkenyl group with 2 to 4 carbon atoms, such as allyl, propenyl and methally, and especially allyl or alkoxy ethylgroup wherein the alkoxy group has 1 to 4 carbon atoms such as methoxy-, ethoxy-, ethoxy-, n- or iso-propoxy-, and n-, iso-, sec.-, or tert.-butoxy, and especially methoxyethyl-, ethoxyethyl-, n- or iso-propoxyethyl and n- or sec.-butoxyethyl;

X, which is halogen atom such as chlorine, bromine, fluorine and iodine, is especially chlorine or bromine;

$n$ is preferably 0, 1 and 2; and

M, which is hydrogen, ammonium or a metal such as sodium, potassium, lithium, etc., is preferably hydrogen, sodium, potassium or ammonium.

It is very surprising that O-alkyl-S-alkyl-O-halo-naphthylphosphorothiolates and O-alkyl-S-2-alkaxyethyl-O-naphthyl (or halo-naphthyl) phosphorothiolates, according to the present invention, exhibit remarkably better insecticidal activity than the analogous O,S-diethyl-O-naphthyl phosphorodithioates.

The compounds of Formula I have excellent biological activities of such a broad range that they are effective both as insecticides and fungicides, and they are of great practical utility. Further, they exhibit an excellent activity even on spider mites which have acquired resistance to organic phosphorus compounds. Further, unlike organic mercury compounds, they are free of any harmful heavy metal; therefore, they do not cause any problem of poison remaining in crops. Further, they do not exhibit a violent acute toxicity which is seen in Parathion or the like, but have little toxicity. Accordingly, they are used advantageously as agricultural chemicals.

The active compounds according to the present invention therefore represent a valuable contribution to the art.

The general process for the preparation of the instant compounds pursuant to process variant (a) is illustrated by the following reaction scheme:

$$\underset{R^2S}{\overset{R^1O}{>}}\underset{}{\overset{O}{\underset{\|}{P}}}-Hal + MO-\text{[naphthyl]}-X_n \longrightarrow$$

(II)  (III)

$$\underset{R^2S}{\overset{R^1O}{>}}\underset{}{\overset{O}{\underset{\|}{P}}}-O-\text{[naphthyl]}-X_n + M-Hal$$

(I)

in which $R^1$, $R^2$, X, M, Hal and $n$ have the same meanings as above.

In process variant (a), the intended organic phosphoric acid esters can be prepared by reacting the reactants alone or with the use of a solvent or diluent.

As the solvent or diluent there may be suitably used aliphatic and aromatic hydrocarbons (which may be chlorinated) such as benzine, methylene chloride, chloroform, carbon tetrachloride, benzene, chlorobenzene, toluene and xylene; ethers such as diethyl ether, dibutyl ether, dioxane and tetrahydrofuran; and low boiling aliphatic alcohols and ketones such as methanol, ethanol, isopropanol, acetone, methylethyl ketone, methylisobutyl ketone, methylisopropyl ketone; and the like. Lower aliphatic nitriles such as acetonitrile, propionitrile, and the like, may also be used.

This reaction may be effected in the presence of an acid binding agent. As the acid binder there may be used carbonates and bicarbonates of alkali metals such as sodium bicarbonate, potassium carbonate and sodium carbonate, alcoholates such as potassium methylate, sodium methylate, potassium ethylate and sodium ethylate; aliphatic, aromatic or heterocyclic tertiary bases such as triethylamine, dimethylbenzylamine, dimethylaniline, pyridine, and the like.

The reaction may be conducted over a broad temperature range, but the reaction is carried out generally at about 0–110° C., preferably at about 10–80° C.

The starting O-alkyl-S-substituted halidephosphorothiolates may be prepared in accordance with a known method by reacting S-substituted dihalidephosphorothiolates with the corresponding alcohol with the use of one of the above-mentioned solvents or diluents. This reaction may be effected in the presence of the above-mentioned acid binder, or by employing the alcohol in the form of a metal salt instead of the acid binder.

Examples of the above-mentioned O-alkyl-S-substituted halide-phosphorothiolate are O-methyl-S-n-propyl-,
O-ethyl-S-methyl-,
O-ethyl-S-ethyl,
O-ethyl-S-n-propyl-,
O-ethyl-S-allyl-,
O-ethyl-S-n-butyl-,
O-ethyl-S-sec-butyl-,
O-n-butyl-S-methyl-,
O-n-butyl-S-ethyl-,
O-ethyl-S-(2-methoxy)ethyl-,
O-ethyl-S-(2-ethoxy)ethyl-,
O-ethyl-S-(2-n-propoxy)ethyl-,
O-ethyl-S-(2-iso-propoxy)ethyl-,
O-ethyl-S-(2-n-butoxy)ethyl-halide-phosphorothiolates, and the like.

As examples of the other starting material, the naphthol of the Formula III, there may be cited α-naphthol, β-naphthol, 4-chloro-α-naphthol, 4-bromo-α-naphthol, 2,4-dichloro-α-naphthol, 1-chloro-β-naphthol, 1-bromo-β-naphthol, 6-bromo-β-naphthol, and the like.

Process variant (b) is illustrated by the following reaction scheme:

$$\left[X_n-\text{[naphthyl]}-O-\underset{\underset{S}{\|}}{\overset{\overset{R^1O}{|}}{\overset{O}{\underset{}{P}}}}\right]\cdot M' + Hal-R^2$$

(IV)  (V)

$$\underset{R^2S}{\overset{R^1O}{>}}\underset{}{\overset{O}{\underset{\|}{P}}}-O-\text{[naphthyl]}-X_n + M'-Hal$$

(I)

in which $R^1$, $R^2$, X, $n$, M and Hal have the same meanings as defined above, M' is ammonium or a metal.

In accordance with this method, the intended esters can be obtained by reacting the reactants alone or by employing the above-mentioned inert solvents or diluents.

The reaction may be conducted over a broad temperature range, but it is generally carried out at a temperature of about 0–100° C., a temperature of about 30–80° C. being preferred.

The starting O-alkyl-O-optionally substituted naphthyl thiophosphates can be prepared by known methods. For instance, they may be obtained by reacting an O-alkyl-O-optionally substituted naphthylthionophosphoryl chloride with an alkali metal hydroxide. The thus obtained O-alkyl-O-optionally substituted naphthyl thiophosphate is reacted with an alkyl-, alkenyl- or 2-alkoxyethyl halide after isolation or without isolation to give the intended product of the Formula I.

As examples of the O-alkyl-O-optionally substituted naphthyl thiophosphate of the Formula IV to be used as the starting material in this reaction, there may be cited sodium, potassium and ammonium salts of O-methyl-O-α-naphthyl-,
O-methyl-O-β-naphthyl-,
O-ethyl-O-α-naphthyl-,
O-ethyl-O-β-naphthyl-,
O-ethyl-O-(4-chloro-α-naphthyl)-,
O-ethyl-O-(4-bromo-α-naphthyl)-,
O-ethyl-O-(2,4-dichloro-α-naphthyl)-,
O-ethyl-O-(1-chloro-β-naphthyl)-,
O-ethyl-O-(1-bromo-β-naphthyl)-,
O-ethyl-O-(6-bromo-β-naphthyl)-,
O-n-butyl-O-α-naphthyl-,
O-n-butyl-O-β-naphthyl-thiophosphoric acids;

and the like.

As examples of the saturated or unsaturated alkyl halide or 2-alkoxyethyl halide of the Formula V to be used as the other starting material in this reaction, there may be cited methyl-, ethyl-, n-propyl-, allyl-, n-butyl-, sec-butyl-, 2-methoxyethyl-, 2-ethoxyethyl-, 2-n-propoxyethyl-, 2-isopropoxyethyl- and 2-n-butoxyethyl-chlorides, bromides, iodides, and the like.

Organic phosphoric acid esters of Formula I have excellent insect-killing properties and may be utilized for controlling and exterminating various harmful insects such as sucking, insects, biting insects and harmful plant parasites. More specifically, they are effective as insecticides against insects harmful to agriculture such as Coleoptera, Lepidoptera, Aphidaera, Orthoptera, Isoptera and Acarina, spider mites and harmful nematodes living in the soil, and they are particularly effective against rice stem borers, leaf- and plant-hoppers, cutworms, common cabbage worms, aphids, fruit moths, leaf rollers, scales and gypsy moths. Thus, they can be used as agents for protecting plants from these insects.

The compounds of Formula I exhibit excellent residual activity when used as insecticides against harmful insects in hygiene and insects harmful to stored grain, such as flies, aphids, mosquitoes, gnats and cockroaches.

The organic phosphoric acid esters of Formula I have excellent activity against pathogenic fungi on plants and prevent growth of these fungi, and they can be utilized for exterminating diseases of plants caused by fungi of a broad range.

As fungicides they can be used effectively for exterminating diseases of plants caused by Archimycetes, Phycomycetes, Basidiomycetes, *Fungi imperfecti* and Ascomycetes and bacteria. They are effective for controlling fungi causing diseases in rice plants, fruit trees and vegetables.

The active compounds according to the instant invention can be utilized, if desired, in the form of the usual formulations or compositions with convential inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, inert gaseous aerosol propellants, and the like. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, etheralcohols, (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolines, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.) and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier compositions mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0005–20%, preferably 0.005–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0005–95%, and preferably 0.005–95%, by weight of the mixture.

Dosage amounts are generally from 15–1,000 g., preferably 40–600 g. of active compound per 10 ares. However, in special cases, it is possible to exceed or reduce the amount and this may sometimes be necessary.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. insects, fungi and pathogenic bacteria, and more particularly methods of combating at least one of insects, fungi and pathogenic bacteria which comprises applying to at least one of correspondingly (a) such insects, (b) such fungi, (c) such bacteria, and (d) the corresponding habitat thereof, i.e. the locus to be protected, a correspondingly combative or toxic amount, i.e. an insecticidally, fungicidally or bactericidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples.

EXAMPLE 1

To a solution of 42 g. of potassium hydroxide in 250 ml. of water are added 250 ml. of dioxane. Under vigorous agitation 106 g. of O-ethyl-O-(1-naphthyl)-thionophosphoryl chloride are added dropwise to the solution at 40–50° C. After completion of the addition, the temperature is raised gradually, and the agitation is further continued at 60–70° C. for 1 hour to complete the reaction.

The dioxane and water are distilled off under reduced pressure and the residue is dissolved again in water, following which benzene is added to the solution and it is shaken. The water layer is concentrated under reduced pressure and the residue is dissolved in acetone, followed by removal of the inorganic salt by filtration.

The acetone is removed by distillation, and toluene and n-hexane are added to the residue to precipitate 80 g.

of potassium O-ethyl-O-(1-naphthyl)thiophosphate of the formula:

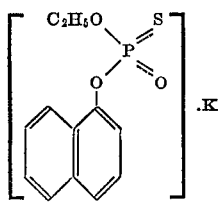

(IVa)

31 g. of potassium O-ethyl-O-(1-naphthyl)thiophosphate are dissolved in 100 ml. of alcohol. To the solution are added dropwise 16 g. of 2-ethoxyethyl bromide and the resulting is agitated for 3 hours at 70° C. The resulting inorganic salt is removed by filtration and the alcohol is distilled off. The residue is dissolved in benzene, and the solution is washed with water and 1% of sodium carbonate, following which the water is removed by anhydrous sodium sulphate and the benzene is distilled off. The residue is subjected to vacuum distillation to give 29 g. of O-ethyl-O-(1-naphthyl)-S-(2-ethoxyethyl)phosphorothiolate (boiling at 168–175° C. under 0.1 mm. Hg and having a refractive index $n^{20}_D$ of 1.5679) of the following formula:

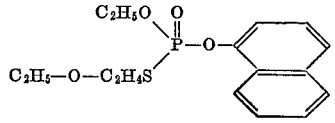

(13)

EXAMPLE 2

21.3 g. of 2,4-dichloro-1-naphthol and 10 g. of triethylamine are dissolved in 150 ml. of benzene. To the resulting solution are added 20.3 g. of O-ethyl-S-n-propyl-chloride-phosphorothiolates at 5° C. After the completion of the addition, the mixture is agitated for a while at room temperature, and agitation is continued at 60° C. for 3 hours to complete the reaction. The reaction mixture is washed with water, 1% hydrochloric acid and 1% sodium carbonate, and the water is removed, followed by removal of the benzene by distillation. The residue is subjected to vacuum distillation to give 28.2 g. of O-ethyl-O-(2,4-dichloro-1-naphthyl)-S-propyl phosphorothiolate (boiling at 181–186° C. under 0.1 mm. Hg and having a refractive index $n^{20}_D$ of 1.5937) of the following formula:

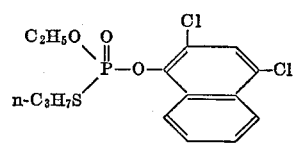

(6)

EXAMPLE 3

Typical examples of the compounds of Formula I which are synthesized by methods similar to that of the above examples are listed in Table (a) and (b).

TABLE 1(a)

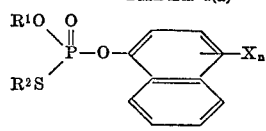

| Compound number | R₁ | R₂ | Xₙ | Boiling point, °C./mm. Hg | Refractive index ($n_D^{20}$) |
|---|---|---|---|---|---|
| 1 | CH₃ | C₃H₇-n | H | 157–163/0.2 | (1.5869) |
| 2 | C₂H₅ | CH₃ | H | 168–170/0.2 | (1.5908) |
| 3 | C₂H₅ | C₂H₅ | H | 165–170/0.15 | (1.5819) |
| 4 | C₂H₅ | C₃H₇-n | H | 158–164/0.1 | (1.5783) |
| 5 | C₂H₅ | C₃H₇-n | 4-Cl | 166–169/0.15 | (1.5827) |
| 6 | C₂H₅ | C₃H₇-n | 2.4-Cl₂ | 18.–186/0.1 | (1.5937) |
| 7 | C₂H₅ | C₃H₇-n | 4-Br | 178–18./0.15 | (1.5971) |
| 8 | C₂H₅ | C₄H₉-n | H | 170–180/0.15 | (1.5671) |
| 9 | C₂H₅ | C₄H₉-sec | H | 159–164/0.1 | (1.5696) |
| 10 | C₄H₉-n | CH₃ | H | 174/0.15 | (1.5773) |
| 11 | C₄H₉-n | C₂H₅ | H | 157/0.12 | (1.5645) |
| 12 | C₂H₅ | CH₃OCH₂CH₂— | H | 171–178/0.15 | (1.5735) |
| 13 | C₂H₅ | C₂H₅OCH₂CH₂— | H | 168–175/0.1 | (1.5679) |
| 14 | C₂H₅ | n-C₃H₇OCH₂CH₂— | H | 160–163/0.05 | (1.5638) |
| 15 | C₂H₅ | i-C₃H₇OCH₂CH₂— | H | 160–163/0.07 | (1.5609) |
| 16 | C₂H₅ | n-C₄H₉OCH₂CH₂— | H | 165–172/0.1 | (1.5559) |
| 17 | C₂H₅ | C₄H₉-sec | 2.4-Cl₂ | | |

TABLE 1(b)

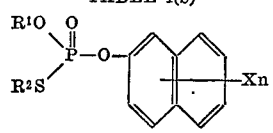

| Compound number | R₁ | R₂ | Xₙ | Boiling point, °C./mm. Hg | Refractive index ($n_D^{20}$) |
|---|---|---|---|---|---|
| 18 | CH₃ | C₃H₇-n | H | 165–167/0.3 | (1.5858) |
| 19 | C₂H₅ | CH₃ | H | 173–180/0.15 | (1.5900) |
| 20 | C₂H₅ | C₂H₅ | H | 155–162/0.07 | (1.5813) |
| 21 | C₂H₅ | C₃H₇-n | H | 162–164/0.1 | (1.5786) |
| 22 | C₂H₅ | C₃H₇-n | 1-Cl | 184–189/0.15 | (1.5810) |
| 23 | C₂H₅ | C₃H₇-n | 1-Br | 193–198/0.2 | (1.5980) |
| 24 | C₂H₅ | C₄H₉-n | H | 163–171/0.07 | (1.5680) |
| 25 | C₂H₅ | CH₂=CHCH₂— | H | 161–168/0.07 | (1.5850) |
| 26 | C₄H₉-n | CH₃ | H | 166/0.1 | (1.5758) |
| 27 | C₄H₉-n | C₂H₅ | H | 168/0.12 | (1.5699) |
| 28 | C₂H₅ | CH₃OCH₂CH₂— | H | 160–165/0.15 | (1.5730) |
| 29 | C₂H₅ | C₂H₅OCH₂CH₂— | H | 159–166/0.07 | (1.5670) |
| 30 | C₂H₅ | n-C₃H₇OCH₂CH₂— | H | 169–174/0.07 | (1.5621) |
| 31 | C₂H₅ | i-C₃H₇OCH₂CH₂— | H | 156–160/0.07 | (1.5608) |
| 32 | C₂H₅ | C₄H₉-sec | H | 161–165/0.1 | (1.5780) |
| 33 | C₂H₅ | C₃H₇-n | 6-Br | 179–183/0.15 | (1.6105) |

EXAMPLE 4

15 parts by weight of Compound 29 of Table 1, 80 parts by weight of a mixture of diatomaceous earth and clay (1:5) and 5 parts by weight of an emulsifier (i.e. polyoxyethylene alkylaryl ether) are mixed and crushed to prepare a wettable powder. This formulation may be diluted with water to the desired concentration and then be used as a ready-to-use-preparation.

EXAMPLE 5

30 parts by weight of Compound 15 of Table 1, 30 parts by weight of xylene, 30 parts by weight of Kawakasol (an aromatic hydrocarbon with a boiling range of 150 to 200° C.) and 10 parts by weight of the emulsifier Sorpol (i.e. polyoxyethylene alkylaryl ether) are mixed and stirred to prepare an emulsifiable concentrate. This formulation may be diluted with water to the desired concentration and then used as a ready-to-use-preparation.

EXAMPLE 6

To a mixture consisting of 10 parts by weight of Compound 6 of Table 1, 10 parts by weight of bentonite, 78 parts by weight of a mixture of talc and clay (1:3) and 2 parts by weight of lignin sulfate, 25 parts by weight of water are added and the mixture is firmly kneaded. It is finely cut into granules of 0.5 to 1.5 mm. diameter by means of a granulating machine. The granules are then dried at a temperature between 40 to 50° C. to obtain a granular formulation. This formulation may direcly be applied to the soil.

EXAMPLE 7

2 parts by weight of Compound 22 of Table 1 and 98 parts by weight of a mixture of talc and clay (1:3) are mixed and crushed to prepare a dust. This formulation may directly be used as a ready-to-use-preparation.

When the compounds used in this invention are compared with those of a similar structure which have been known from the literature and with compounds having similar activities, they are found generally to give substantially improved results, and their toxicity to warm-blooded animals is extremely low. Accordingly, these compounds are of great utility. Unexpected advantages and prominent effects of these compounds can be seen from the test results below.

EXAMPLE 8

Insecticidal test against tobacco cutworm (*Prodenia litura*) larvae

Solvent: 5 parts by weight of aceton
Emulsifier: 1 part by weight of polyoxyethylene alkylaryl ether To prepare a suitable preparation of the active compound, 1 part by weight of the active compound was thoroughly mixed with the stated amount of solvent and the stated amount of emulsifier. The obtained emulsifiable concentrate was then diluted with water to the desired concentration.

Leaves of sweet potato were dipped in the diluted preparation of the active compound and then dried and put in a Petri dish of 9 cm. diameter. 10 tobacco cutworm larvae were then placed in the dish. The dish was kept at a temperature of 28° C. 30 test insects were used altogether for each active compound at each concentration.

After 24 hours, the number of dead insects were counted and the mortality rate was calculated as a percentage. 100% means that all insects were killed, 0% means that none of the insects were killed.

The average results obtained are shown in the table below.

TABLE 2.—RESULTS OF TESTS AGAINST TOBACCO CUTWORM LARVAE

| | Mortality (percent) at an active ingredient concentration of— | | |
|---|---|---|---|
| | 1,000 p.p.m. | 300 p.p.m. | 100 p.p.m. |
| Compound of Table 1: | | | |
| 1 | 100 | 90 | 30 |
| 4 | 100 | 100 | 60 |
| 5 | 100 | 100 | 80 |
| 6 | 100 | 100 | 90 |
| 12 | 100 | 100 | 90 |
| 13 | 100 | 100 | 100 |
| 14 | 100 | 100 | 80 |
| 15 | 100 | 100 | 100 |
| 16 | 100 | 100 | 70 |
| 18 | 100 | 100 | 100 |
| 21 | 100 | 100 | 100 |
| 22 | 100 | 100 | 100 |
| 23 | 100 | 100 | 100 |
| 28 | 90 | 60 | 10 |
| 29 | 100 | 100 | 90 |
| 30 | 100 | 100 | 70 |
| 31 | 100 | 100 | 90 |
| Control: | | | |
| A | 100 | 25 | 0 |
| B | 10 | 0 | 0 |

NOTE.—Control A=O, S-diethyl-O-naphthyl phosphorodithioate; Control B=O,O-dimethyl-2,2,2-trichloro-1-hydroxyethyl phosphonate (Dipterex).

EXAMPLE 9

Test against fall webworms (*Hyphantria cunea*) larvae

Leaves of mulberry were dipped in the diluted preparation of the active compound prepared in the same manner described in Example 8 and then dried and put in a Petri dish of 9 cm. diameter. 10 fourth-instar ball webworm larvae then placed in the dish. The dish was kept at a temperature of 25° C. 30 test insects were used altogether for each active compound at each concentration. After 24 hours, the number of dead insects were counted and the mortality rate was calculated as a percentage. 100% means that all insects were killed, 0% means that none of the insects were killed.

The average results obtained are shown in the table below.

TABLE 3.—RESULTS OF TESTS AGAINST FALL WEBWORMS

| | Mortality (percent) at an active ingredient concentration of— | | |
|---|---|---|---|
| | 1,000 p.p.m. | 300 p.p.m. | 100 p.p.m. |
| Compound of Table 1: | | | |
| 1 | 100 | 100 | 80 |
| 4 | 100 | 100 | 70 |
| 18 | 100 | 100 | 100 |
| 21 | 100 | 70 | 30 |
| Control: | | | |
| B | 100 | 100 | 20 |
| C | 90 | 0 | 0 |

NOTE.—Control B = O,O-dimethyl-2,2,2-trichloro-1-hydroxyethyl phosphonate (Dipterex); Control C=O,O-dimethyl-4-(methylthio)-3-methylphenyl thiophosphate (Lebaycid).

EXAMPLE 10

Test against rice stem borers (*Chilo supperssolis*) larvae

Egg masses of rice stem borer were attached to paddy rice plants of tillering stage, 3 to 5 of which being in one pot of about 12 cm. diameter. 7 days after the hatching of the eggs, such plants were sprayed with the preparation of the active compound prepared in the same manner described in Example 8 until dripping wet. 3 pots were used for each active compound at each concentration. The pots were placed in a greenhouse and the temperature was maintained at 25° C. Three days after the spraying, the stems of the plants were split by hand and the numbers of surviving dead insects in the stems were counted and the mortality rate was calculated as a percentage. 100% means that all the insects were killed, 0% means that none of the insects were killed.

The average results obtained are shown in the table below.

TABLE 4.—RESULTS OF TESTS AGAINST RICE STEM BORERS

| | Concentration of active ingredient (p.p.m.) | Mortality (percent) |
|---|---|---|
| Compound of Table 1: | | |
| 1 | 250 | 17.1 |
| 4 | 250 | 98.4 |
| 5 | 250 | 92.8 |
| 6 | 250 | 95.8 |
| 12 | 250 | 100 |
| 13 | 250 | 86.3 |
| 14 | 250 | 100 |
| 15 | 250 | 100 |
| 16 | 250 | 100 |
| 21 | 250 | 98.0 |
| 22 | 250 | 100 |
| 23 | 250 | 100 |
| 28 | 250 | 96.8 |
| 29 | 250 | 100 |
| 30 | 250 | 100 |
| 31 | 250 | 100 |
| Control: | | |
| B | 250 | 95 |
| C | 250 | 100 |

EXAMPLE 11

Test against the adult house fly (*Musca domestica*)

1 ml. of the diluted preparation of the active compound prepared in the same manner described in Example 8 was adsorbed onto filter paper placed in a Petri dish of 9 cm. diameter. 10 mature female adult house flies were then placed in the Petri dish. The dish was kept at a temperature of 28° C. 30 test insects were used altogether for each active compound at each concentration.

After 24 hours, the number of dead insects was counted and the mortality rate was calculated as a percentage. 100% means that all insects were killed, 0% means that none of the insects were killed.

The average results obtained are shown in the table below.

TABLE 5.—RESULTS OF TESTS AGAINST THE ADULT HOUSE FLY

| | Mortality (percent) at an active ingredient concentration of— | |
|---|---|---|
| | 1,000 p.p.m. | 100 p.p.m. |
| Compound of Table 1: | | |
| 1 | 90 | |
| 4 | 80 | 20 |
| 5 | 100 | 20 |
| 6 | 100 | 100 |
| 12 | 90 | 50 |
| 13 | 100 | 40 |
| 14 | 100 | 100 |
| 15 | 100 | 100 |
| 16 | 90 | 50 |
| 22 | 100 | 40 |
| 28 | 60 | 30 |
| 29 | 100 | 40 |
| 30 | 100 | 60 |
| 31 | 100 | 40 |
| DDT control [1] | 100 | 20 |
| Control A | 60 | 0 |

[1] DDT=P,P-dichlorodiphenyltrichloroethane.

EXAMPLE 12

Test against carmine mite imagines (*Tetranychus telarius*)

Test procedure.—On the first two leaves of kidney bean seedlings, each of which were grown in pots of 6 cm. in diameter, 100 mature and infant carmine mites with organophosphorus acaricide resistance were placed. After 2 days, the preparation of the active compounds prepared in the same manner described in Example 8 was sprayed until dripping wet. The so-treated pots were then placed in a greenhouse at the temperature of 25° C. After 10 days, the controlling effect was evaluated according to the following scale:

Index number
3 No living imago, nymph or egg
2 less than 5% of living imagines, nymphs and eggs based on the non-treated control
1 5–50% of living imagines nymphs and eggs based on the non-treated control
0 more than 50% of living imagines, nymphs and eggs based on the non-treated control The average results obtained are shown in the table below.

TABLE 6.—RESULTS OF TESTS AGAINST CARMINE MITES

| | Index number of carmine mite controlling effect at an active ingredient concentration of— | | |
|---|---|---|---|
| | 1,000 p.p.m. | 300 p.p.m. | 100 p.p.m. |
| Compound of Table 1: | | | |
| 1 | 3 | 3 | 1 |
| 13 | 3 | 3 | 3 |
| 14 | 3 | 3 | 3 |
| 15 | 3 | 3 | 3 |
| 18 | 3 | 1 | |
| 22 | 3 | 3 | 2 |
| 29 | 3 | 3 | 3 |
| Control: | | | |
| D | 3 | 2 | 0 |
| E | 3 | 1 | 0 |
| Non-treated: Control | | 0 | |

NOTE.—Control D=P-chlorophenyl-P-chlorobenzene sulphonate ("Ovotran", CPCBS); Control E=O,O-diethyl-S-(2,5-dichlorophenylthiomethyl) dithiophosphate ("Phenkapton", CPM).

EXAMPLE 13

Test against mosquito (*Culex molestus*) larvae 100 ml. of the diluted preparation of the active compound prepared in the same manner described in Example 8 was adsorbed onto filter paper placed in a Petri dish of 9 cm. diameter. 25 mosquito larvae were then placed in the Petri dish. The dish was kept at a temperature of 28° C. 75 test insects were used altogether for each active compound at each concentration.

After 24 hours, the number of dead insects was counted and the mortality rate was calculated as a percentage. 100% means that all insect were killed, 0% means that none of the insect were killed.

The average results obtained are shown in the table below.

TABLE 7.—RESULTS OF TESTS AGAINST MOSQUITO LARVAE

| | Mortality (percent) at an active concentration of— | | | |
|---|---|---|---|---|
| | 1 p.p.m. | 0.1 p.p.m. | 0.01 p.p.m. | 0.001 p.p.m. |
| Compound of Table 1: | | | | |
| 6 | 100 | 100 | 100 | 5.5 |
| 9 | 100 | 100 | 100 | |
| 14 | 100 | 100 | | |
| 17 | 100 | 100 | 100 | |
| 22 | 100 | 100 | | |
| 32 | 100 | 100 | 95 | |
| 33 | 100 | 100 | | |
| Control B | 100 | 100 | | |

EXAMPLE 14

Test against various kinds of insect pests

The average results obtained by various kinds of tests conducted in the same manner described above are shown in the table below.

TABLE 8.—RESULTS OF TESTS AGAINST VARIOUS KINDS OF INSECT PESTS

| Compound of Table 1 | Concentration of a.i. (percent) | Phaedon cochleariae | Plutella maculipennis | Myzus persicae | Tetranychus urticae |
|---|---|---|---|---|---|
| 6 | 0.1 | 100 | 100 | 99 | 100 |
| | 0.01 | 100 | 100 | 95 | 100 |
| | 0.001 | 100 | 80 | 70 | 90 |
| | 0.0001 | 0 | 70 | 0 | 0 |
| | 0.00001 | | 0 | | |

EXAMPLE 15

Test against rice blast (*Piricularia oryzae*)/(pot test)

Solvent: 5 parts by weight of aceton
Emulsifier: 1 part by weight of polyoxyethylene alkylaryl-ether To prepare a suitable preparation of the active compound, 1 part by weight of the active compound was thoroughly mixed with the stated amount of solvent and the stated amount of emulsifier. The obtained emulsifiable concentrate was then diluted with water to the desired concentration.

(a) Test of protective effect.—Rice plants (Jukkoku variety) were grown in pots each having a diameter of 12 cm. In the tillering stage, such plants were sprayed with the preparation of the active compound until dripping wet.

For the next two days, the treated pots were placed in a chamber at a temperature of 25° C. and a relative atmospheric humidity of about 100%. Twice during this time, such plants were inoculated by spraying with a suspension of cultured spores of Piricularia oryzae.

Seven days after inoculation, the degree of infestation was determined by applying a scale ranging from 0 to 5, and the protective value of each particular active compound against Piricularia oryzae was determined in accordance with the formula below.

Degree of infestation:  Infested area of leaf in percent of total leaf
0 _____ 0
0.5 _____ 0–2
1 _____ 2–5
2 _____ 5–10
3 _____ 10–20
4 _____ 20–40
5 _____ 40 or more Protective value = 100

$$\frac{\text{Degree of infestation of treated plants}}{\text{Degree of infestation of non-treated plants}} \times 100$$

The particular active compounds tested, their concentrations and the average results obtained can be seen from the following Table 9.

At the same time the phytotoxcity against rice plants was determined.

EXAMPLE 16

Test against rice sheath blight (Pellicularia sasakii)/(pot test)

Rice plants (Kinmaze variety) were grown in pots each having a diameter of 12 cm. In the beginning of the tillering stage, the preparation of active compound prepared in the same manner described in Example 13 was sprayed onto the test plant until dripping wet.

On the next day, the sclerotium of Pillicularia sasakii, obtained by culturing for 10 days in a wheat culture medium, was inoculated onto the roots of the plants. The pots were then maintained for 8 days in a chamber at a temperature between 28 and 30° C. and a relative atmospheric humidity of at least 95%.

The infestation of the stems was determined and characterized by the values $n_0$ to $n_3$ having the meaning given below.

The degree of infestation was determined by means of the Formula 1 and the protective value of each compound was calculated in accordance with the Formula 2:

$$\text{Degree of infestation} = \frac{3 \cdot n_3 + 2 \cdot n_2 + 1 \cdot n_1 + 0 \cdot n_0}{3 \cdot N} \times 100 \quad (1)$$

wherein

N = the number of the total stems examined
$n_0$ = the number of non-infested stems
$n_1$ = the number of stems infested up to the first leaf (from the bottom)
$n_2$ = the number of stems infested up to the second leaf (from the bottom)
$n_3$ = the number of stems infested up to and above the third leaf (from the bottom)

Protective value = 100

$$\frac{\text{Degree of infestation of treated plants}}{\text{Degree of infestation of non-treated plants}} \times 100 \quad (2)$$

The active compounds tested, their concentrations and the average results can be seen from the following Table 9.

TABLE 9.—RESULTS OF TESTS AGAINST RICE BLAST AND SHEATH BLIGHT

| Compound of— | Concentration of active ingredient, p.p.m. | Protective value of— Blast | Protective value of— Sheath blight | Phytotoxicity |
|---|---|---|---|---|
| 1 | 500 | 69 | 81 | — |
| 2 | 500 | | 62 | — |
| 3 | 500 | | 68 | — |
| 4 | 500 | | 90 | — |
| 5 | 500 | | 70 | — |
| 6 | 500 | | 66 | — |
| 7 | 500 | | 69 | — |
| 8 | 500 | | 60 | — |
| 9 | 500 | 86 | | — |
| 10 | 500 | | 75 | — |
| 11 | 500 | | 69 | — |
| 12 | 500 | | 85 | — |
| 13 | 500 | 90 | 72 | — |
| 15 | 500 | | 76 | — |
| 18 | 500 | | 92 | — |
| 19 | 500 | | 85 | — |
| 20 | 500 | | 83 | — |
| 21 | 500 | | 85 | — |
| 22 | 500 | | 65 | — |
| 24 | 500 | | 61 | — |
| 25 | 500 | | 68 | — |
| 26 | 500 | | 86 | — |
| 27 | 500 | | 89 | — |
| 28 | 500 | | 87 | — |
| 29 | 500 | | 88 | — |
| Control: | | | | |
| A | 500 | 15 | 30 | — |
| F | 500 | 82 | 54 | — |
| Non-treated: Control | | 0 | 0 | — |

[1] Phytotoxicity = —means that no ill effect on the growth of rice plants was seen.
[2] Control F = O,O-diisopropyl-S-benzylthiolphosphate ("Kitazin", IBP).

It will be appreciated that the instant specification and examples are set forth by way of illustration and not limitation and that various modifications and changes may be made without departing from the spirit and scope of the present invention.

What is claimed is:

1. A naphthylphosphorothiolate of the formula

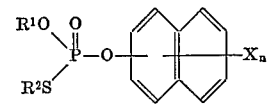

in which

R¹ is alkyl of 1 to 2 carbon atoms,
R² is n-propyl or sec.-butyl,
X is chlorine or bromine, and
n is zero, 1 or 2.

2. Compound according to claim 1 wherein n is 1 or 2.
3. Compound according to claim 1 wherein R² is n-propyl.
4. Compound according to claim 1, wherein R¹ is ethyl.

5. Compound according to claim 1 wherein such compound is O-ethyl-O-(2,4-dichloro-1-naphthyl)-S-n-propyl phosphorothiolate of the formula

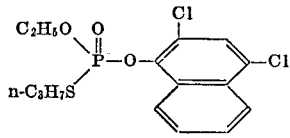

6. Compound according to claim 1 wherein such compound is O-ethyl-O-(1-chloro-2-naphthyl)-S - n - propyl phosphorothiolate of the formula

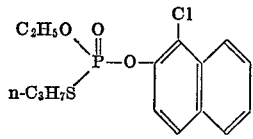

7. Compound according to claim 1 wherein such compound is O-ethyl-O-(1-bromo-2-naphthyl) - S - n - propyl phosphorothiolate of the formula

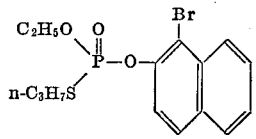

8. Compound according to claim 1 wherein such compound is O-ethyl-O-[2,4-dichloro-(1-naphthyl)] - S - sec.-butyl phosphorothiolate of the formula

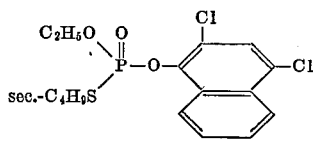

References Cited
UNITED STATES PATENTS
2,928,864  3/1960  Tabor _____ 260—964 X
FOREIGN PATENTS
16,875  9/1963  Japan _____ 260—964

ANTON H. SUTTO, Primary Examiner

U.S. Cl. X.R.
260—950, 955, 956; 424—217, 219, 224

UNITED STATES PATENT OFFICE
CERTIFICATE OF CORRECTION

Patent No. 3,798,293  Dated March 19, 1974

Inventor(s) SHIGEO KISHINO ET AL  (Page 1 of 2)

It is certified that error appears in the above-identified patent and that said Letters Patent are hereby corrected as shown below:

Col. 1, formula (I), correct to read as follows:

Col. 2, formula (V), correct to read as follows:

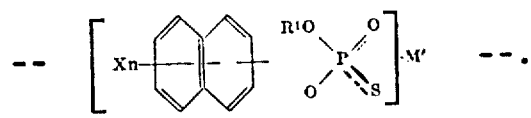

Col. 2, line 35, change "methally" to -- methallyl --.

Col. 2, line 48, correct spelling of "alkoxyethyl".

Col. 4, line 62, cancel " , " (comma) after "sucking".

Col. 8, Tables 1(a) and 1(b), in the heading, change "Refractive index($n_O^{20}$) to -- Refractive index ($n_D^{20}$) --.

Col. 8, Table 1(a), under heading " Boiling point°C/mm.Hg"

Compound No. 6, change "18-186" to -- 181-186 --;

Compound No. 7, change "178-18" to -- 178-181 --.

UNITED STATES PATENT OFFICE
CERTIFICATE OF CORRECTION

Patent No. 3,798,293  Dated _____

Inventor(s) _____ (Page 2 of 2)

It is certified that error appears in the above-identified patent and that said Letters Patent are hereby corrected as shown below:

Col. 10, Table 2, under heading " 100 p.p.m."

Compound No. 5, change "80" to -- 70 --;

Compound No. 6, change "90" to -- 80 --.

Signed and sealed this 26th day of November 1974.

(SEAL)
Attest:

McCOY M. GIBSON JR.
Attesting Officer

C. MARSHALL DANN
Commissioner of Patents